Figure 1:
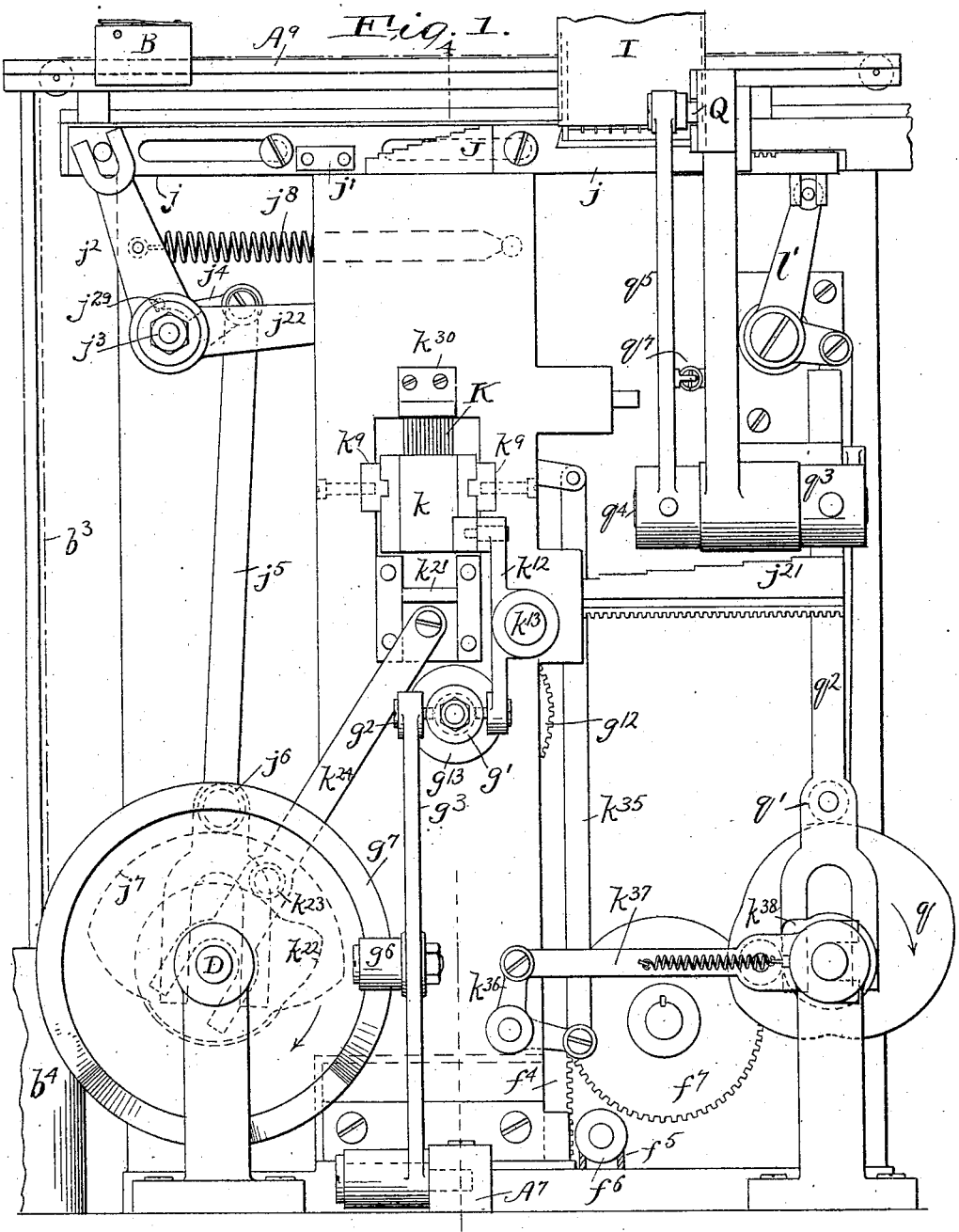

No. 848,809. PATENTED APR. 2, 1907.
F. B. CONVERSE, Jr.
JUSTIFYING MECHANISM.
APPLICATION FILED SEPT. 4, 1903.

11 SHEETS—SHEET 1.

No. 848,809. PATENTED APR. 2, 1907.
F. B. CONVERSE, Jr.
JUSTIFYING MECHANISM.
APPLICATION FILED SEPT. 4, 1903.

11 SHEETS—SHEET 3.

Witnesses.
E. B. Gilchrist
J. B. Hill

Inventor,
Francis B. Converse Jr.
By his Attorneys,
Thurston & Bates

No. 848,809. PATENTED APR. 2, 1907.
F. B. CONVERSE, JR.
JUSTIFYING MECHANISM.
APPLICATION FILED SEPT. 4, 1903.

11 SHEETS—SHEET 5.

No. 848,809. PATENTED APR. 2, 1907.
F. B. CONVERSE, Jr.
JUSTIFYING MECHANISM.
APPLICATION FILED SEPT. 4, 1903.

11 SHEETS—SHEET 7.

Witnesses
E. B. Gilchrist
J. B. Hull

Inventor
Francis B. Converse, Jr.
By his Attorneys
Thurston & Bates

No. 848,809. PATENTED APR. 2, 1907.
F. B. CONVERSE, Jr.
JUSTIFYING MECHANISM.
APPLICATION FILED SEPT. 4, 1903.
11 SHEETS—SHEET 10.
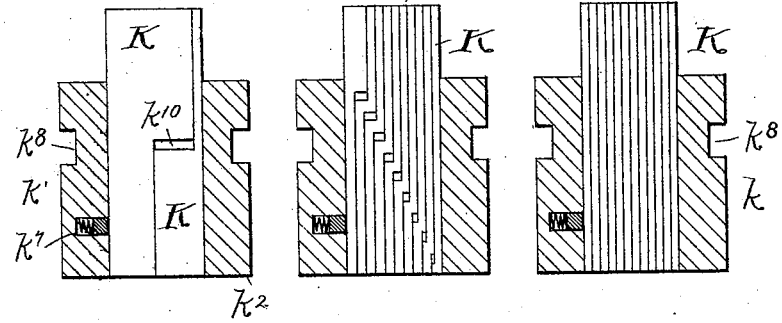
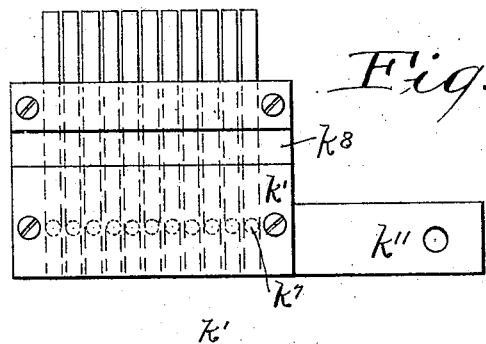
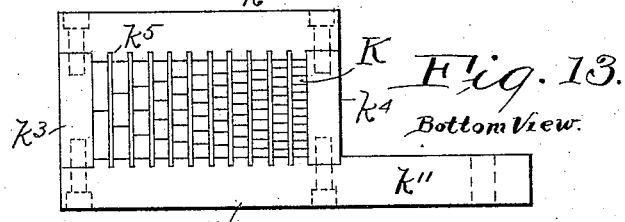
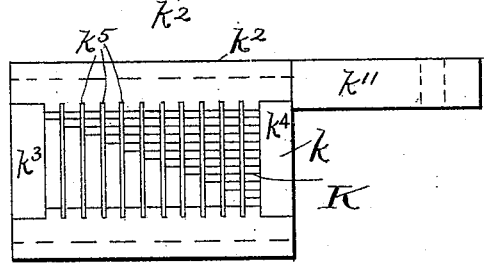
Witnesses.
E. B. Gilchrist
J. B. Hill.
Inventor:
Francis B. Converse Jr.
By his Attorneys,
Thurston & Bates.

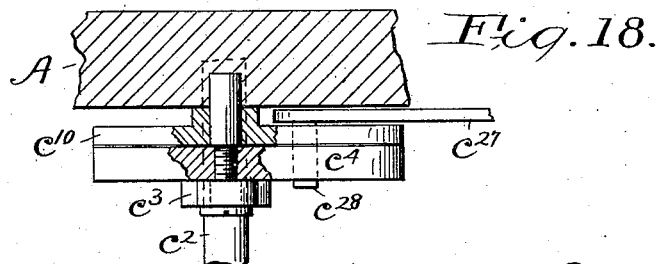
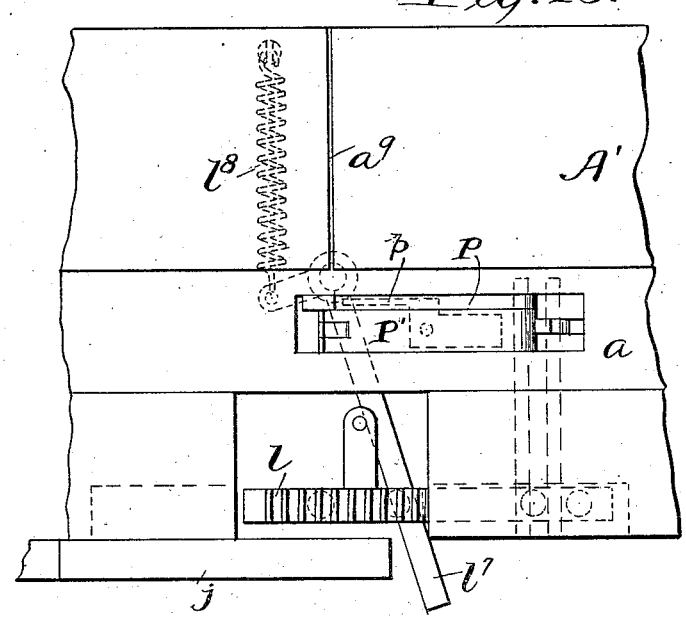
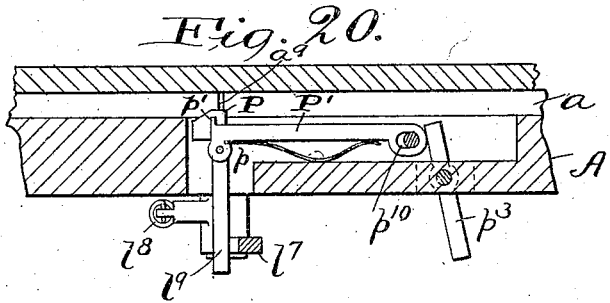

UNITED STATES PATENT OFFICE.

FRANCIS B. CONVERSE, JR., OF CLEVELAND, OHIO, ASSIGNOR, BY MESNE ASSIGNMENTS, TO THE CLEVELAND TYPESETTER COMPANY, OF CLEVELAND, OHIO, A CORPORATION OF OHIO.

JUSTIFYING MECHANISM.

No. 848,809.      Specification of Letters Patent.      Patented April 2, 1907.

Application filed September 4, 1903. Serial No. 172,001.

*To all whom it may concern:*

Be it known that I, FRANCIS B. CONVERSE, Jr., a citizen of the United States, residing at Cleveland, in the county of Cuyahoga and State of Ohio, have invented a certain new and useful Improvement in Justifying Mechanism, of which the following is a full, clear, and exact description, reference being had to the accompanying drawings.

*General statement.*—The object of this invention is to provide a simple, efficient, and rapidly-operating machine for the automatic justification of type. The term "type" is used herein as including both the cameo form or ordinary printers' type and the intaglio form or matrices in which the printing-face may be cast.

The machine is adapted to operate in conjunction with any form of typesetting-machine which is capable of delivering to it an assembled line of type with interposed temporary spaces at points in the line where regular type-spaces are to be inserted and in conjunction with any suitable mechanism for taking care of the justified line, as by delivering it into a galley.

A complete machine embodying the present invention includes the following coöperating mechanisms: first, a suitable channel for carrying the line of type as it comes to the machine; second, a space-recording mechanism which takes account of the number of spaces in the line; third, a line-measuring mechanism which measures the amount by which the line set up is different in length from the desired line as justified; fourth, a space-selecting mechanism which operates according to the number of spaces in the line and the variation in length of the line, being controlled by the two preceding mechanisms to determine the proper size of space required; fifth, a mechanism called the "fractional spacing mechanism," (which is really a portion of the space-selecting mechanism,) effective when the line will not exactly justify with but one size of permanent space, whereby a portion of one size and a portion of another size may be used to make the proper aggregate thickness; sixth, a line-advancing mechanism to carry the line through the justifying mechanisms; seventh, a space-substituting mechanism which acts as such line is advanced to replace the temporary spaces by permanent spaces selected of the proper thickness.

The present invention is concerned with the space-selecting and fractional spacing mechanisms, the other mechanisms being shown to clearly illustrate the complete operation. Many features of these other mechanisms are covered in my prior patents, Nos. 717,169 and 738,741, issued December 31, 1902, and September 8, 1903, respectively, and my prior pending applications, Serial No. 3,280, filed January 30, 1900, and Serial No. 4,124, filed February 5, 1900.

*Drawings.*—In the drawings the justifying system is shown as embodied in a machine for operating on ordinary printers' type, and such embodiment will now be described.

Figure 2:
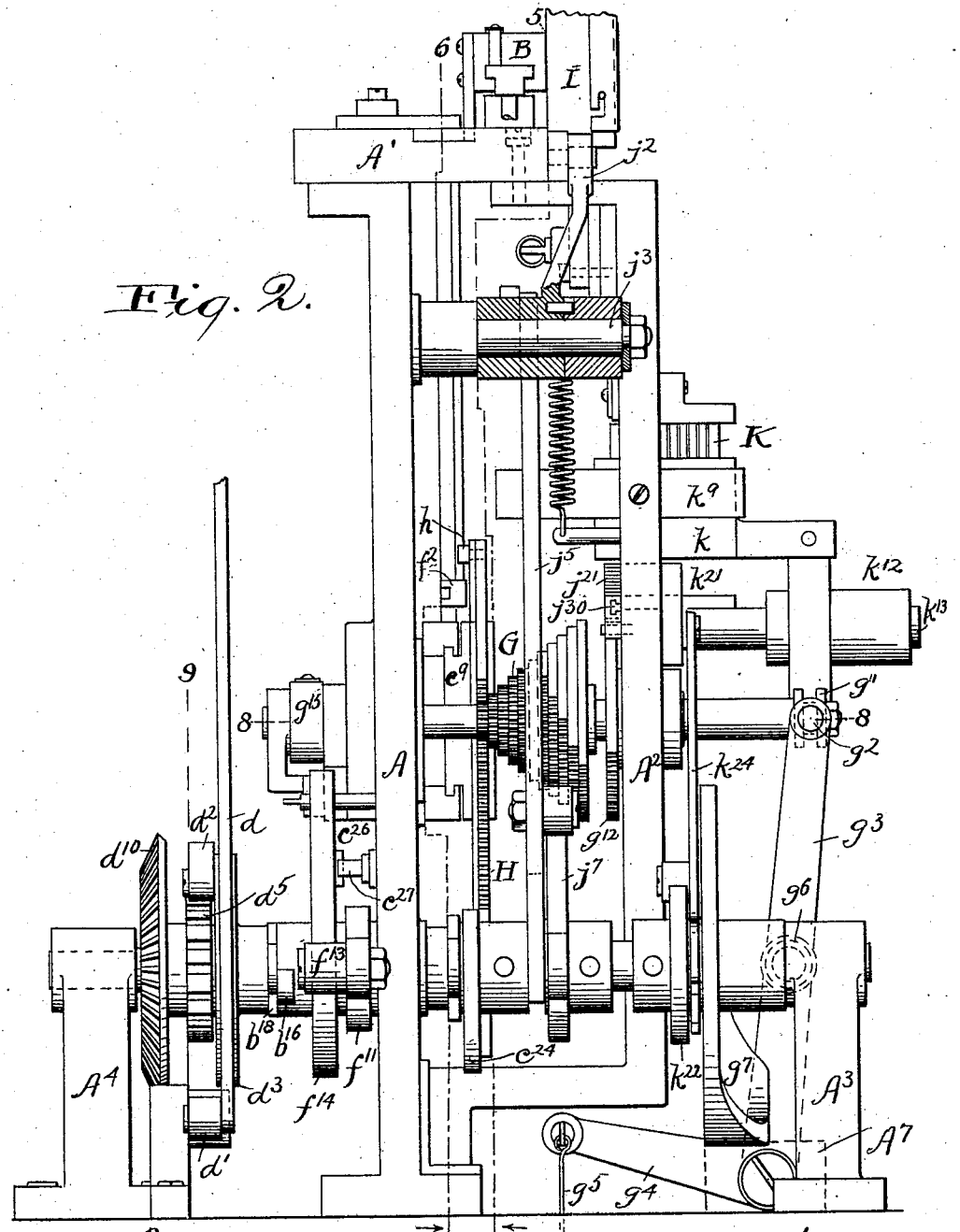
Figure 3:
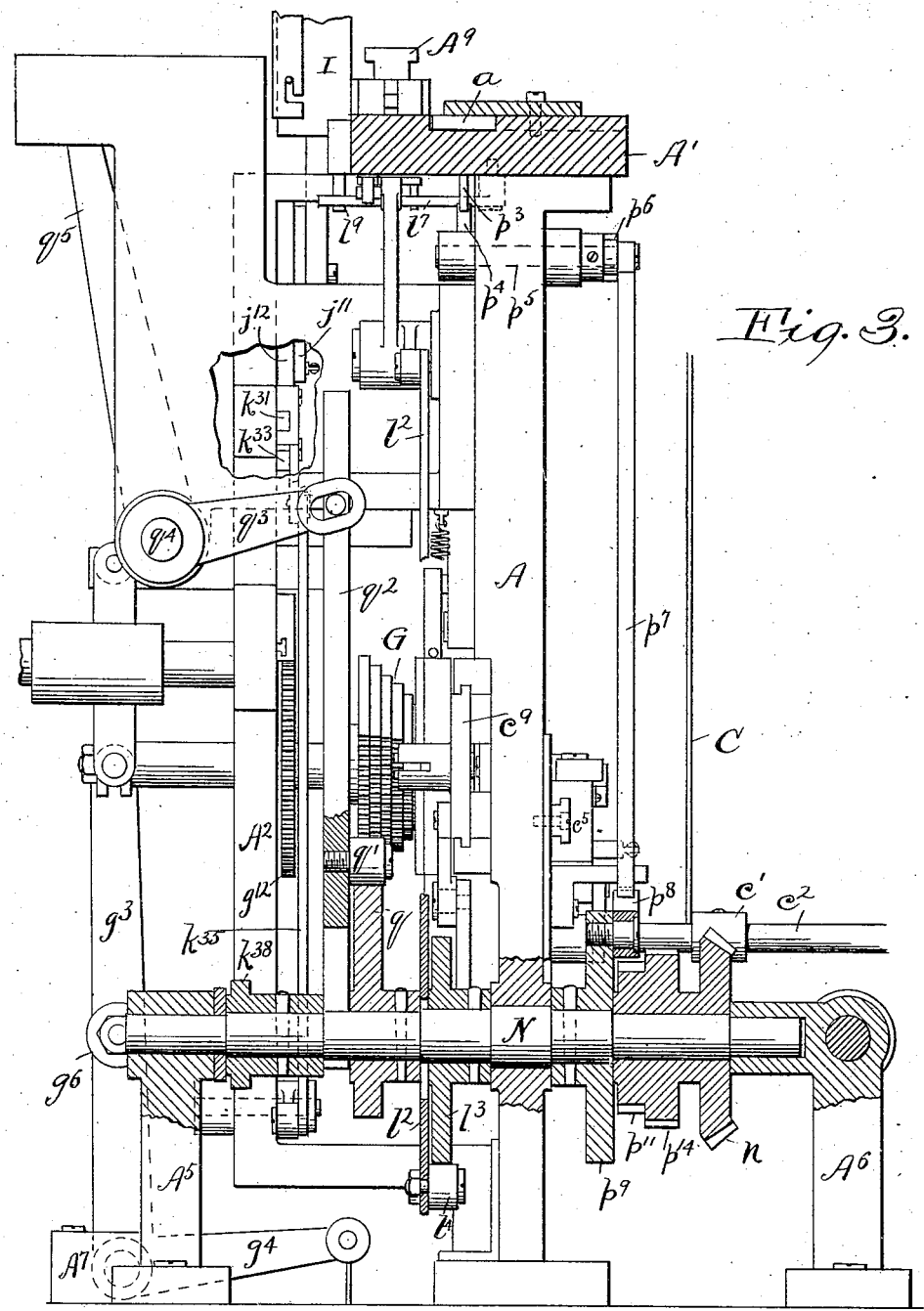
Figure 4:
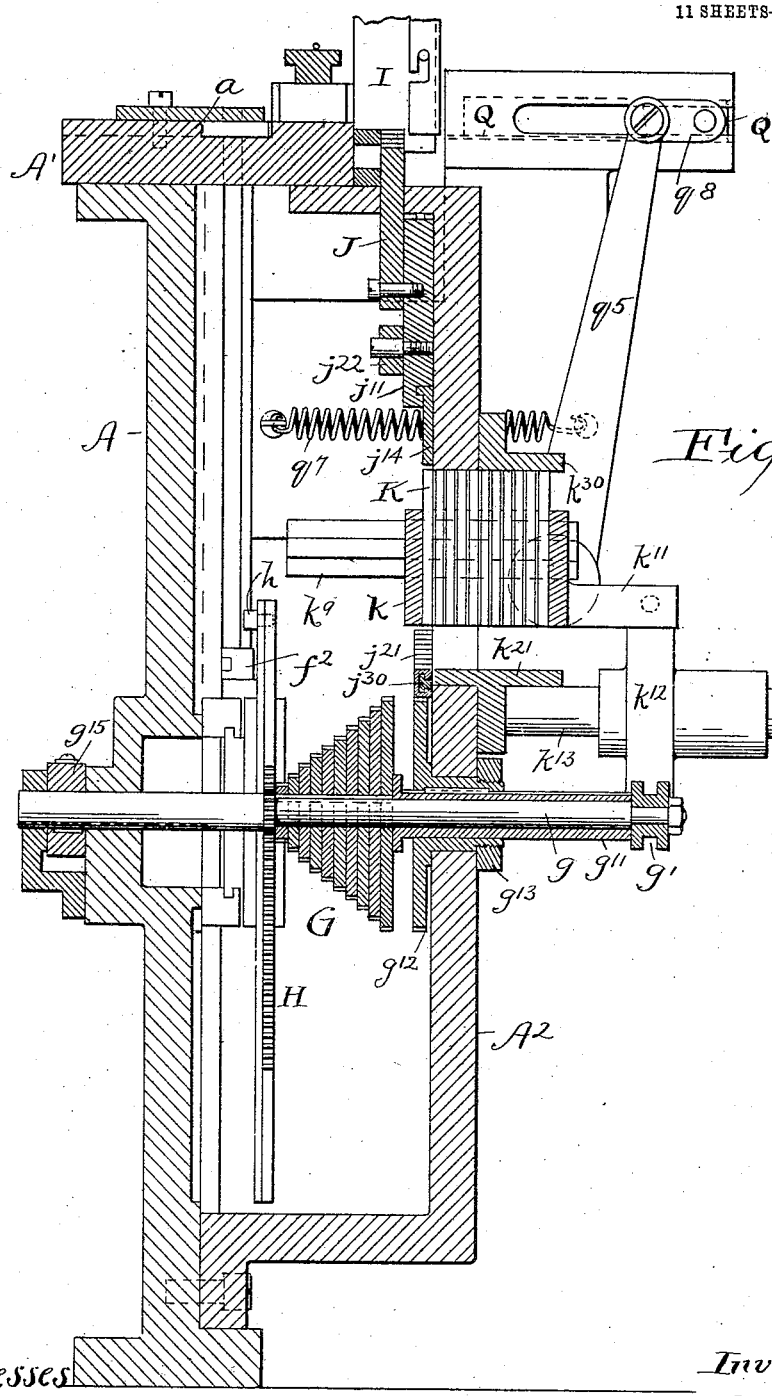
Figure 5:
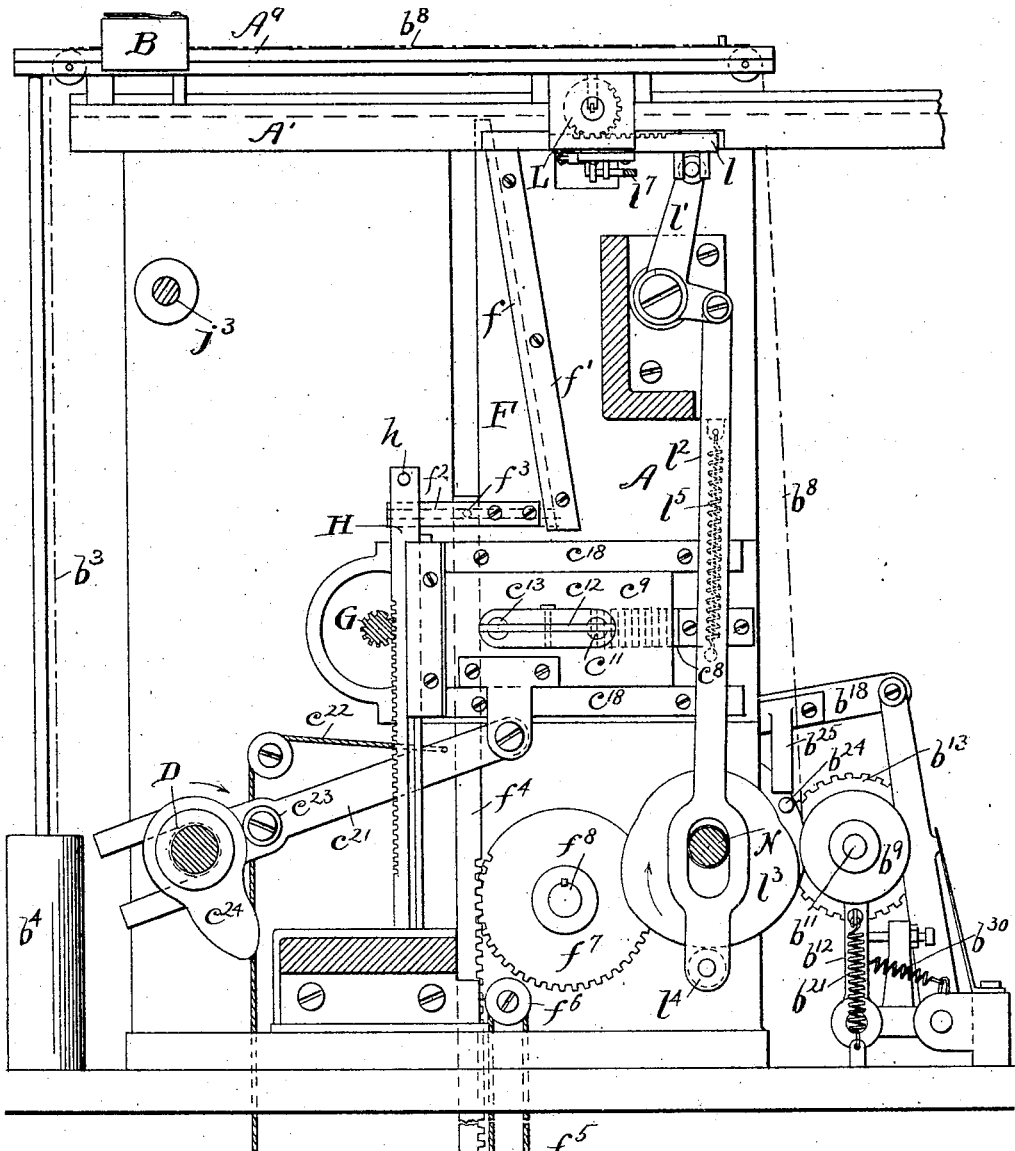
Figure 6:
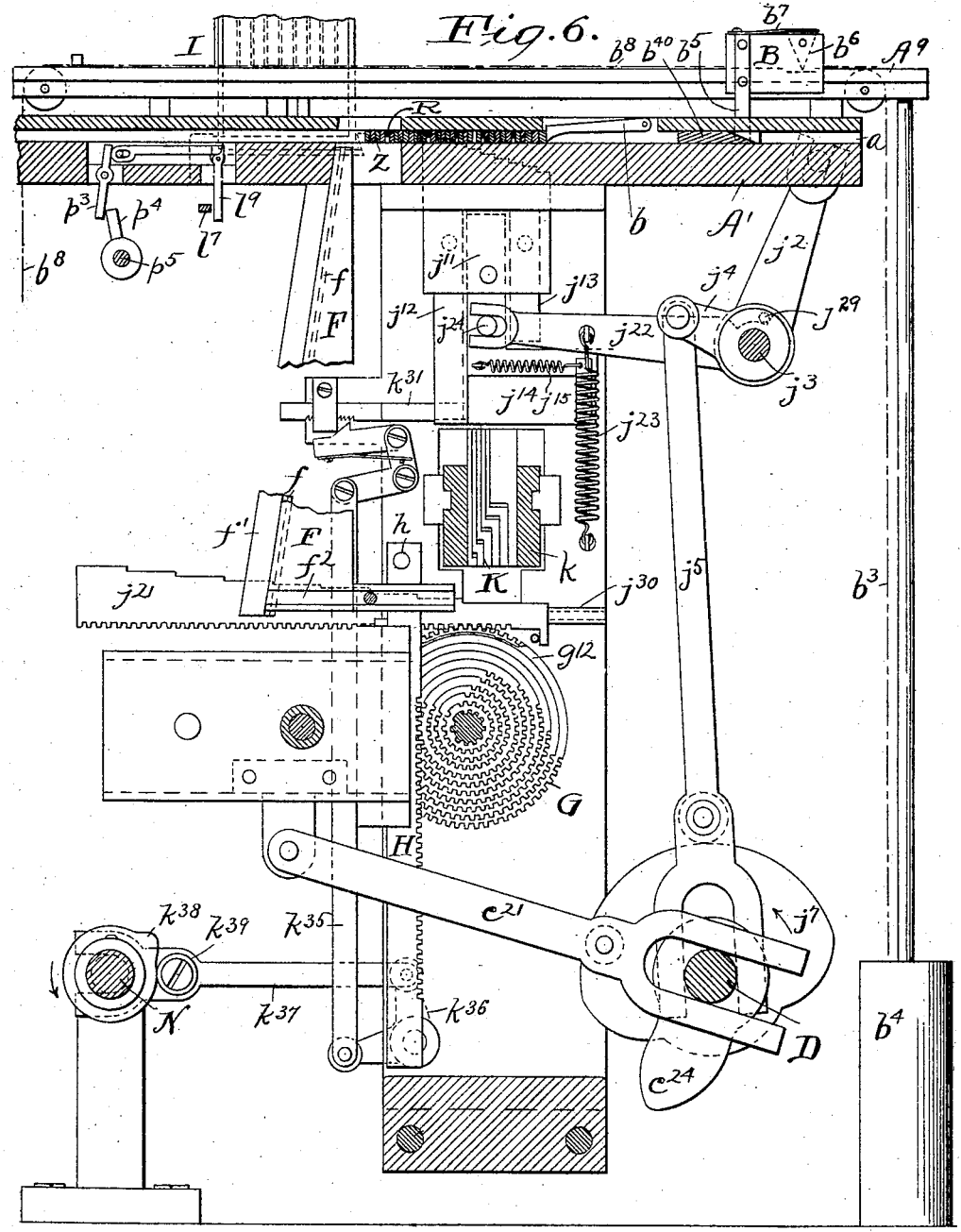
Figure 7:
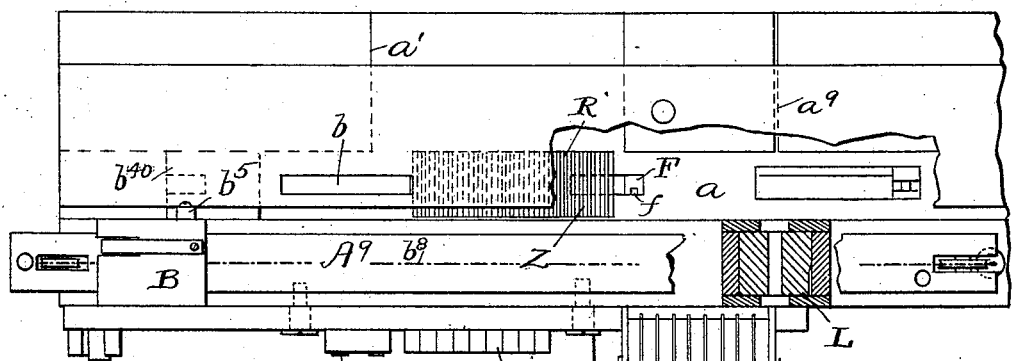
Figure 8:
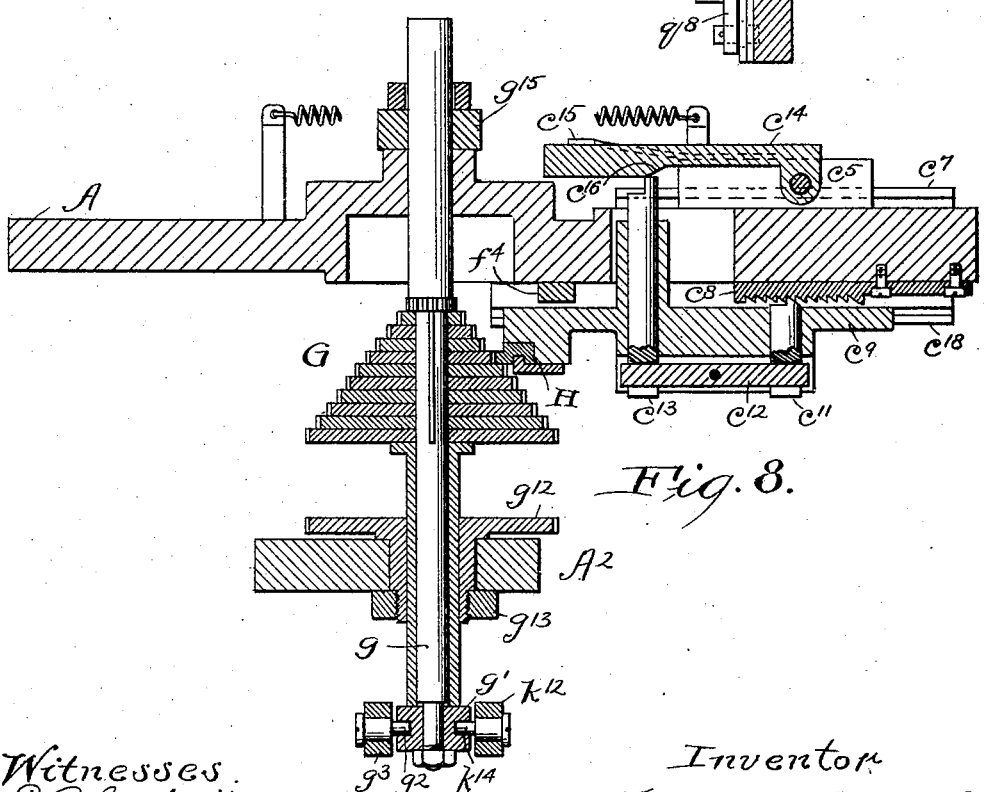
Figure 9:
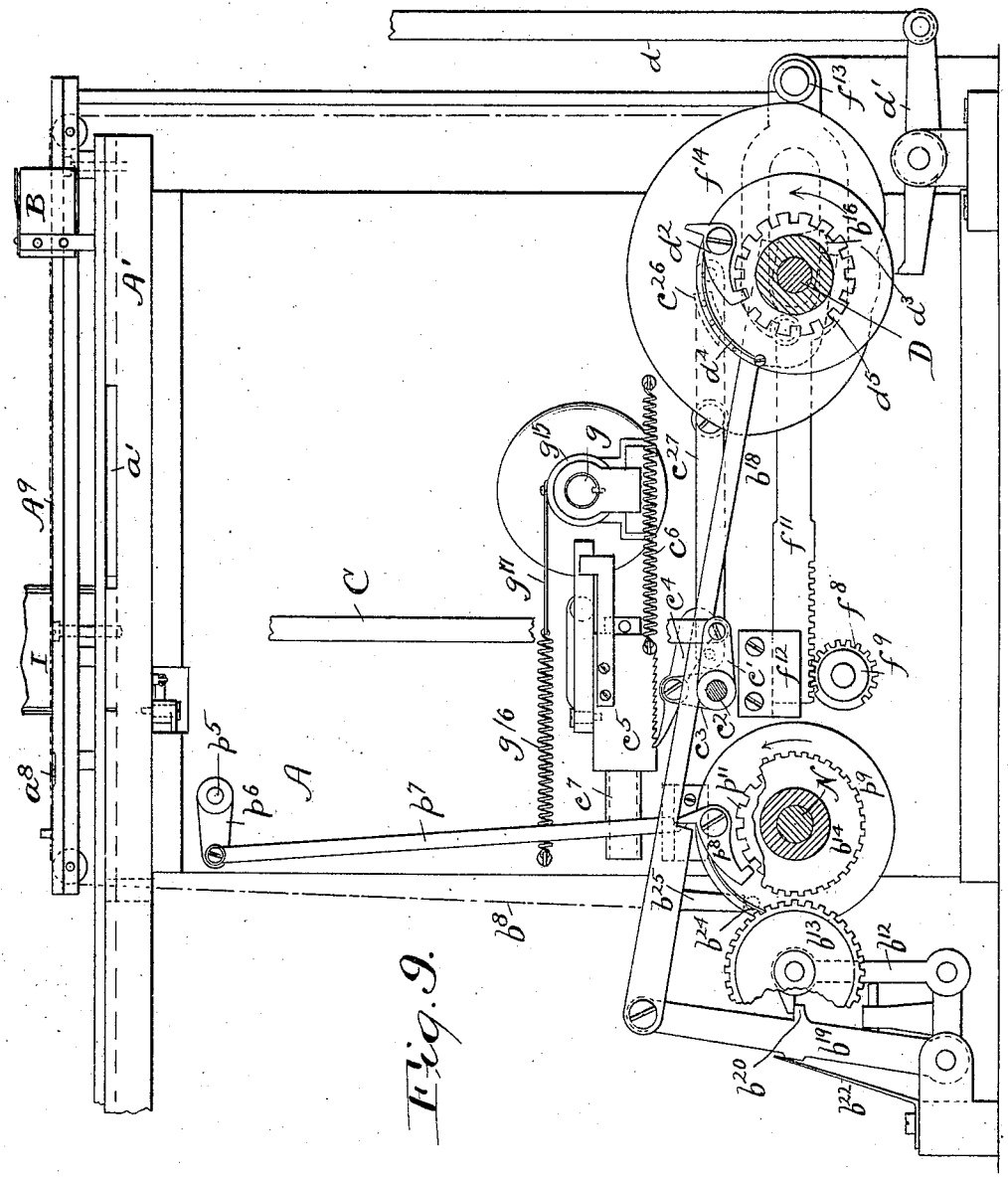
Figure 10:
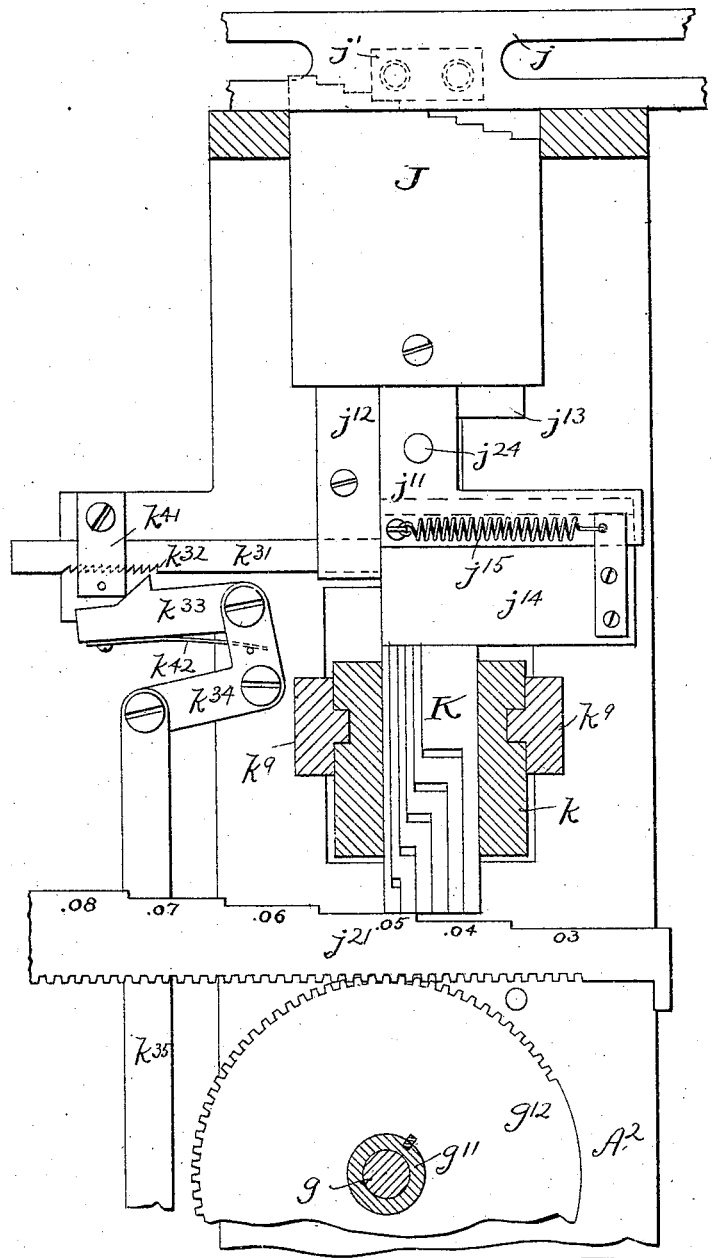

Figure 1 is a front elevation of the machine, the upper portion of the space-case being broken away and the delivery mechanism being omitted. Fig. 2 is an end view taken from the left-hand end of Fig. 1. Fig. 3 is an end view taken from the right-hand end of Fig. 1, sectioned through one of the operating-shafts known as the "word-shaft." Fig. 4 is a vertical section of the machine through the fractional spacing mechanism, being on the line 4 4 of Fig. 1. Fig. 5 is a vertical section parallel with Fig. 1, being taken on the line 5 5 of Fig. 2 looking to the rear. Fig. 6 is a vertical section parallel with Fig. 1, taken on the line 6 6 of Fig. 2 and looking to the front. Fig. 7 is a plan of the machine. Fig. 8 is a horizontal section on the line 8 8 of Fig. 2. Fig. 9 is a rear elevation sectioned through the hubs of the clutch members on the two shafts, as indicated by the line 9 9 of Fig. 2. Fig. 10 is a face view of the fractional spacing mechanism looking at the rear side of the same, being an enlargement of a portion of Fig. 6. Fig. 11 is a view of the temporary space employed. Figs. 12 to 17 are details of the fractional-spacing mechanism, Fig. 12 being a side elevation of the box of plungers, Fig. 13 a bottom view thereof, Fig. 14 a top view thereof. Figs. 15, 16, and 17 are cross-sections of the box of plungers for a two-space line, a ten-space line, and a twelve-space line, respectively. Fig. 18 is a detail showing the space-recording pawls in place. Fig. 19 is a plan of the justifying-channel, showing the word-shaft trip and gap-opener, omitting the space-turner; and Fig. 20 is a vertical section through the justifying-channel, showing such parts.

*Reference-letters.*—The scheme of reference-letters employed is to have each letter, whether large or small and with various exponents, refer to the same general division or submechanism as follows: A, frame; B, followers and advancing mechanism; C, space-recording mechanism; D, line-shaft and its actuating mechanism; F, measuring-wedge; G, series of selecting-gears; H, rack for series of selecting-gears; I, permanent-space case; J, space-case-operating mechanism; K, fractional-spacing mechanism; L, space-turner and gap-opener; N, word-shaft; P, word-shaft trip; Q, space-ejector; R, temporary space; Z, type.

*Frame.*—The various mechanisms for the most part are carried by a vertical plate A, which is supported on a suitable bed and extends lengthwise through the machine. On the upper end of this plate is mounted a horizontal plate A', having in it a longitudinal recess $a$, which constitutes the justifying-channel. The line of type Z, with interspersed temporary spaces R, is fed into this channel through an opening $a'$ thereinto from the rear, Figs. 7 and 9, and the completely-justified line is fed out of the channel at the right-hand end of Fig. 1. Secured to the front side of the plate A is a bracket in the form of a narrow vertical plate $A^2$, which assists in carrying the space-selecting and fractional-spacing mechanisms. The main operating-shafts D and N extend through the plate A and are journaled therein and also in four standards, two on each side of the plate, (designated $A^3$, $A^4$, $A^5$, and $A^6$.)

*Space-recording mechanism.*—The space-recording mechanism is adapted to be actuated once for each temporary space in the line. This may be accomplished by the temporary spaces themselves after the line is assembled or by the operation of the space-key in the setter, which acts as the line is being assembled. The mechanism therefor is best shown in Figs. 5, 8, 9, and 18.

In Fig. 9, C indicates an operating-link for the space-recording mechanism, which may be connected directly at its upper end with the space-key lever of the setter. In any case it is adapted to be drawn upward once for each space in the line. This link is connected at its lower end with a rock-arm $c'$ on a rock-shaft $c^2$, which carries another arm $c^3$, carrying a pawl $c^4$. This pawl is adapted to engage teeth on a block $c^5$, slidable upon a gib $c^7$, and feed the block to the left in Fig. 9 a tooth at a time as the link C is elevated. A pawl $c^{10}$, Fig. 18, similar in shape to the pawl $c^4$ and directly behind it, retains the block $c^5$ against retrograde movement, a spring $c^6$ giving the block a tendency in such return direction. Thus the block $c^5$ takes a position dependent upon the number of spaces in the line.

On the front side of the plate A is a stationary rack $c^8$, Figs. 5 and 8, having teeth corresponding to the teeth on the block $c^5$. Slidable on gibs $c^{18}$ on the front side of the plate A is a plate $c^9$, which carries a plunger-pawl $c^{11}$, adapted to engage with the teeth of the rack $c^8$ and connected by a lever $c^{12}$ with another plunger-pawl $c^{13}$. Pivoted to the block $c^5$ is an arm $c^{14}$, pressed toward the plate A by a spring $c^{15}$ and having an inclined shoulder $c^{16}$. Now after the block $c^5$ has been positioned according to the number of spaces the plate $c^9$ is at the proper time moved to the extreme right by reason of the cam $c^{24}$, Fig. 5, shoving on the roller $c^{23}$ on a link $c^{21}$, connected to the plate. The right-hand end tooth of the rack $c^8$ projects forward slightly farther than the other teeth of this rack. As the pawl $c^{11}$ is advanced against this tooth in the movement of the plate first referred to the pawl is forced forward far enough to permit it to clear the other teeth of the rack $c^8$ as the plate moves to the left. Following the extreme movement of the plate to the right a weight on the cord $c^{22}$, connected to the link $c^{21}$, moves the plate to the left until the rear end of the plunger-pawl $c^{13}$ engages the incline $c^{16}$ on the arm $c^{14}$. Thereupon this plunger-pawl will be forced forward and the plunger-pawl $c^{11}$ will be thereby forced rearward, locking the plate $c^9$ to the stationary rack $c^8$ in a position which is a number of teeth from the left of the rack $c^8$ corresponding to the tooth of the block $c^5$ engaged by the pawl $c^4$. Thereafter the cam-piece $c^{26}$ (on the forward side of the cam $f^{14}$, Fig. 9) presses down the adjacent end of the pivoted lever $c^{27}$, whose other end carries a pin $c^{28}$, Fig. 18, beneath the tails of the two pawls $c^4$ and $c^{10}$, and this action moves these pawls to release the block $c^5$ to allow it to be returned to its original position by the spring $c^6$. Thus the record of the number of spaces is transferred from the block $c^5$ to the plate $c^9$ and the former is at once ready for taking account of the number of spaces in the succeeding line as it is being assembled.

The machine shown for convenience is arranged to operate on lines having anywhere from two to twelve spaces between words. The theoretically-possible one-space line is not provided for in the mechanism, as it practically never occurs in actual operation. Therefore the position of the parts shown in Fig. 8, where the pawl $c^{11}$ engages the fifth tooth of the rack $c^8$, is for a line having six temporary spaces.

*Line-measuring mechanism.*—The assembled line, with the temporary spaces in place, is fed by suitable mechanism (not shown) into a position in the justifying-channel just in front of the pawl $b$, Figs. 6 and 7, which forms an abutment against which the line is to be measured. The measuring mechanism proper comprises a wedge and means for feeding it upward against the right-hand end of the line to compact the line against the abutment and the mechanism for operating the wedge. These features are best shown in Figs. 5 and 6.

F indicates the wedge, which along its inclined edge has a tongue-and-groove connection $f$ with a stationary gib $f'$. The right-hand edge of the wedge in Fig. 6 is vertical and stands at a distance from the end of the pawl $b$, theoretically just equal to the required length of line or column width, practically a slightly greater distance. Thus the distance between the vertical edge of the wedge and the end of the type (shown in Figs 6 and 7 as Z) is equal to the amount which the unjustified line is less than the column width (or the "line shortage") plus a small amount of allowance to permit the wedge to rise a short distance before reaching its true zero position. This allowance is represented by the distance between the pin $h$ and bar $f^2$, hereafter referred to. Now as the wedge moves upward it travels toward the type (owing to the sliding connection by its inclined edge) until it is stopped by taking up this shortage, compacting the line against the pawl $b$, wherefore the travel of the wedge is dependent upon the shortage of the line.

The wedge carries at its lower end a horizontal grooved extension $f^2$, in which takes a pin $f^3$ on the upper end of a bar $f^4$, which is given an upward tendency by a weight (not shown) pulling down on a cord $f^5$, which passes over a pulley $f^6$ and is secured at its lower end to the bar $f^4$. On this bar $f^4$ are teeth which mesh with the teeth of a gear $f^7$, which is on a short shaft $f^8$, journaled in the plate A. On the rear end of the shaft $f^8$ is a pinion $f^9$, Fig. 9, meshing with teeth on a link $f^{11}$, the free end of which is guided by the gib $f^{12}$, the other end yoking around one of the main shafts D (known as the "line-shaft") and carrying a roller $f^{13}$, adapted to bear against the periphery of a cam $f^{14}$ on that shaft. It thus results that when upon rotation of the shaft D a decreasing face of the cam $f^{14}$ allows the weight, pulling downward on the cord $f^5$, will raise the wedge until it is stopped by compacting the line, the wedge remaining in this position until the increasing face of the cam draws it down to normal position.

The shaft D is given one complete rotation for each line. This rotation is initiated by the link $d$, Figs. 2 and 9, which is drawn upward by the operator at the end of the line, and this movement withdraws the end of the lever $d'$ (to which the lower end of the link is connected) from engagement with a pawl $d^2$, carried by a disk $d^3$, rigid with the shaft D, whereupon this pawl is forced by a spring $d^4$ into engagement with a continuously-rotating notched member $d^5$. This causes the line-shaft D to rotate until as one rotation is completed the tail of the pawl $d^2$ engages the end of the replaced lever $d'$, and thus the pawl draws itself out of engagement with the notched member $d^5$, bringing the line-shaft to rest. For convenience of illustration this line-shaft is shown herein as having made something less than the half-rotation from its position of rest. Now one of the first operations of the line-shaft D is to cause the cam $c^{24}$ to position the space-recording plate $c^9$ as already explained, and this positioning of the plate brings into a corresponding definite position a vertical rack H. This rack is secured to the left-hand edge of the plate by the gib $c^{30}$, which permits a free vertical movement of the rack upon the plate $c^9$. After this positioning of the rack H mechanism, shortly to be described, comes into operation and moves a series of gears G (hereinafter more fully described) rearward until stopped by the side of some gear overhanging and engaging the side of the rack, the rack meshing with the next smallest gear. This is the position of the parts shown in Fig. 8. In this position the wedge begins to rise, and the extension $f^2$ thereof engages a pin $h$, Figs. 5 and 6, extending rearward from the rack H, and this raises this rack a distance proportionate to the line shortage. This gives to the periphery of the gear G, which is in engagement, a like movement. Suitable mechanism (to be hereinafter described) acts as a friction-brake on the series of gears and prevents their return rotation, and hence they hold the rack H elevated, and the wedge returns idly.

*Space-selecting mechanism.*—The system of gears G referred to consists of several gears, of radii increasing in an arithmetic ratio, arranged in a cone. The number of these gears is theoretically equal to the maximum number of spaces in any line which may be justified by the machine, though for convenience of construction the gear for a one-space line is omitted, being unnecessary. Thus, as shown in the drawings, there are eleven gears, and this provides for lines having from two to twelve spaces to be justified, thus taking care of thirteen words, (a justifying-space between each two words.) As lines with more than that number of words are very unusual, it is not deemed necessary to provide more gears. Such abnormally spaced lines as do occur are easily taken care of during the setting operation by the insertion of an ordinary printer's space between some of the words. If desired, however, a larger number of gears than those shown may be employed. The radius of the smallest of the complete series of gears being one unit—that is, the omitted gear which would be brought into use in the justification of a line containing one space—the radius of the next gear is two units, (for a two-space line,) the radius of a three-space gear is three units, and so on, the radius of each gear being as many times that of the gear for one space as there are spaces in the line with which the given gear is designed to operate.

The gears G are all rigid with a shaft $g$, which is slidably and rotatably mounted in the frame-plate A and the frame-bracket $A^2$, Figs. 4 and 8. On the forward end of this shaft is a collar $g'$, into which takes a pin $g^2$, carried by the upper end of a lever $g^3$, Figs. 1 and 2, which is pivoted to a small frame-standard $A^7$ and is given a constant tendency to move rearward by a suitable downward pull on a bell-crank arm $g^4$ of said lever. This pull may be a weight (not shown) on the end of a link $g^5$. This lever carries a roller $g^6$, which is adapted to be actuated by the crown-cam $g^7$ on the line-shaft D. Now the cam $g^7$ is so placed that immediately preceding the locating of the plate $c^9$ the increasing face of this cam acts on the roller $g^6$ to move the series of gears to the front, taking them all out of the path of the rack H. The cam $c^{24}$ then acts to locate the plate $c^9$ and the rack H, as heretofore fully described. Following this and before the wedge rises the decreasing face of the cam $g^7$ allows the lever $g^3$ to move rearward until one of the gears G meshes with the rack H, as heretofore stated.

The gears G are normally held at a zero position by reason of a spring $g^{16}$, Fig. 9, secured to a strap $g^{17}$, which is fastened to the periphery of a small drum $g^{15}$ on the shaft $g$. In the zero position of the gears G every gear has a tooth on the side toward the rack H in the same horizontal plane, which plane passes through the center of the shaft $g$, whence it follows that the rack H may mesh with any gear which the space-recording mechanism determines. Now the position of the plate $c^9$, if there were but one temporary space in the line, would be such that the rack H would mesh with the smallest of the complete theoretic series of gears G. If there were two temporary spaces in the line, the plate $c^9$ would be positioned one tooth to the right, Figs. 5 and 8, which distance would just allow the next gear of the series (the first one shown) to mesh with the rack, and so on. This is the position shown in Figs. 2, 4, and 5. Thus that gear meshes with the rack which corresponds to the number of spaces in the line. The gear for the one-space line being omitted, it takes two depressions of the space-key, acting through the block $c^5$ and the plate $c^9$, to bring the rack H into the position shown in Fig. 5, where it engages the smallest actual gear. It takes six depressions to bring it into the position shown in Fig. 8.

It will be seen that the rotation which the rise of the wedge gives to the shaft $g$ is dependent upon the two factors of the number of spaces in the line and the line shortage. The greater the shortage the greater the rotation for a given number of spaces, or, conversely stated, the greater the number of spaces the less the rotation for a given shortage. This relation may be stated as a mathematical formula. Let R equal amount of rotation of shaft $g$, N equal number of spaces, S equal line shortage, C equal a constant dependent on the actual proportion of the parts. Then R equals $\dfrac{CS}{N}$. The rotation of the shaft $g$ is thus proportional to the quotient obtained by dividing the line shortage by the number of spaces, and this quotient is, moreover, the theoretic size of space required to exactly justify the line.

The permanent spaces which are selected by this machine and inserted in the line in place of temporary spaces are contained in channels in a vertical space-case I, Figs. 1, 4, 6, and 7. This space-case is divided into several channels, (nine being shown,) and each of these channels carries a different size of permanent spaces, (each size differing from the adjacent sizes by a uniform amount,) the spaces lying on their flat side and being arranged in the order of their thicknesses, the thinnest space in the left-hand channel, Fig. 1, and the thickest space in the right-hand channel. The space-case extends upward such a distance that it may be pivoted above and at its lower end swing a short distance in substantially a straight line to bring any one of the channels in line with the space-ejector Q.

The space-case is positioned by means of a bar $j$, which engages its lower end and carries a block $j'$, adapted to engage with any of the steps of the plate J, according to the position of the plate. Yoking around a pin projecting from the bar $j$ is an arm $j^2$, journaled on the stud $j^3$ and having a bell-crank arm $j^4$ with which connects a link $j^5$, carrying a roller $j^6$, adapted to be engaged by a cam $j^7$. A spring $j^8$, acting on the arm $j^2$, tends to counteract the cam.

The first movement of the line-shaft D is to cause the cam $j^7$ to act on the roller $j^6$, and thus shift the space-case to the extreme left, as shown in Fig. 1. In this position it is held while the larger concentric face of the cam $j^7$ is rotating past the roller. During this time the rotation of the gears G, heretofore mentioned, has positioned the plate J by mechanism about to be described, and then when the decreasing face of the cam $j^7$ allows it the spring $j^8$ moves the space-case back toward the right until stopped by the block $j'$ engaging one of the steps of the plate J. The position of the space-case, and hence the size of spaces to be injected into the line, is therefore dependent upon the position of the plate J, each of the steps of that plate corresponding to one size of permanent spaces.

The plate J is vertically slidable by means of a vertical bar $j''$, Figs. 4, 6, and 10, connected therewith and dovetailed between gibs $j^{12} j^{13}$. The lower end of the bar $j^{11}$ is extended horizontally, and in this extension is formed a groove in which takes a rib along the upper edge of the plate $j^{14}$. This plate $j^{14}$ thus makes a downward extension of the plate J, though it may move crosswise with reference thereto. A spring $j^{15}$ connects the plate $j^{14}$ with the bar $j^{11}$ and tends to move that plate toward the left in Figs. 6 and 10, thus causing its left-hand end to aline with the left-hand end of the extension $j^{11}$.

Surrounding the shaft $g$, upon which is keyed the cone of gears G, is a sleeve $g^{11}$, rigidly clamped between the largest gear and the collar $g'$. Slidably splined to this sleeve is a gear $g^{12}$. This gear has its bearing in the bracket $A^2$, being held in place by a nut $g^{13}$. The hub of the gear forms a slidable bearing for the cone-of-gears shaft. This gear $g^{12}$ meshes with gear-teeth in the under edge of a bar $j^{21}$, slidably mounted on the T-rail $j^{30}$ and having its upper edge stepped into as many steps as there are different sizes of permanent spaces—nine in this case.

Between the steps of the bar $j^{21}$ and the lower edge of the plate $j^{14}$ are a series of plungers K, contained in a suitable frame $k$, slidably secured by gibs $k^9$, rigidly carried by the bracket $A^2$. This series of plungers constitutes a portion of the fractional-spacing mechanism and will be hereinafter described. For the present it is sufficient to say that they constitute distance-pieces between the steps of the bar $j^{21}$ and the plate $j^{14}$.

In the zero position of the gears G the bar $j^{21}$ is at its extreme left, as shown in Fig. 6. The plungers K may thus engage the lowest step of that bar which will bring down the plate J to its lowermost position, allowing the stop $j'$ to rest on the extreme left-hand step of that plate, positioning the space-case in its extreme left-hand position, Fig. 6, (that is, its extreme right-hand position, Fig. 1,) with the thinnest size of spaces in the line with the ejector Q. Now the thinnest size of the permanent spaces is the same size as the temporary spaces employed. If the line as first set up should be just the required length, the wedge would rise only the distance between the bar $f^2$ on the wedge and the pin $h$ on the rack H, and the gears G would not be rotated, the bar $j^{21}$ would remain in its zero position, and the plate would position the space-case for the smallest size of spaces. If, however, there is any line-shortage, (which of course there almost always is,) it is because spaces larger than the temporary spaces are required to fill the line. This shortage, allowing the wedge to rise above the position just described, rotates the gears G and shifts the bar $j^{21}$ according to the size of space required, as is now to be explained. The rise of each step on the bar $j^{21}$ is equal to the rise of a step on the plate J, and the length of each step on this bar $j^{21}$ is the amount which the bar will be shifted when the shaft $g$ is rotated through the angle corresponding to an increase of one unit in the size of spaces required in the line. There are as many steps on the bar $j^{21}$ as there are different sizes of permanent spaces, and each step corresponds to a size. The actual length of the steps on the bar $j^{21}$ is dependent upon the proportions of the parts. For example, the gear $g^{12}$, which engages the bar $j^{21}$, is shown of the same size as the largest one of the gears G—that is, the gear corresponding to the twelve-space line. If there were twelve spaces in the line and this largest gear were in action and if the difference between successive units of permanent spaces is one-hundredth of an inch and if the taper of the wedge is one to six, then the total difference between all the spaces of one size and all of the next would be .12 of an inch and the rise of the wedge would be six times this amount, or .72 of an inch. This would give a corresponding movement to the periphery of the gear $g^{12}$, and hence to the bar $j^{21}$, wherefore in that instance the lengths of the steps on the bar would be .72 inch. Now the bar $j^{21}$ moving one step when the gears are rotated the angular distance corresponding to the distance between successive units of spaces it follows that if the parts are so placed that the plungers K engage the extreme end of the lowest step for the smallest size of spaces they will occupy the same position on the second step when the second size of space is required and the next step for the third size, and so on. Usually the bar $j^{21}$ will assume a position such that the plungers will rest upon a step, but will overhang the step next lower, as shown in Fig. 10, because the theoretic size of space required is intermediate of any of the existing sizes. This initially places the permanent-space case in the same position as if all the plungers were engaging the higher step; but the fractional-spacing mechanism about to be explained will during the substitution cause the overhanging plungers to move down onto the next step, shifting the space-case and causing the insertion of a different size of spaces. This initial location of the space-case takes place while the concentric face of smallest radius of the cam $f^{14}$ is passing the roll $f^{13}$ of the link $f^{11}$, which controls the movements of the measuring-wedge—that is, while the wedge is in its highest position in the act of measuring the line. The plungers K, pressed downward by the tension of the spring $j^{23}$ against the stepped bar $j^{21}$, form a friction-brake which prevents the spring $g^{16}$, secured to the drum $g^{15}$ on the rear end of the shaft $g$, from rotating the gears in a reverse direction when the wedge descends.

*Fractional-spacing mechanism.*—As suggested, it will happen that most lines will require more than a single size of spaces to properly justify them, it not being practicable to carry in the machine enough different sizes of spaces to permit all lines to be sufficiently closely justified by the insertion of only a single size. It is therefore necessary to provide means for the selection of a portion of the spaces in any line of one size and the remainder of the spaces of another size, preferably of the next adjacent size—in the machine as at present constructed of the next smaller size. Thus, by way of illustration, the spaces used in the present machine are three-hundredths, four-hundredths, five-hundredths, six-hundredths, &c., of an inch in thickness, each size being one-hundredth of an inch thicker than the preceding size. Now if the line to be justified contains seven spaces and is, exclusive of the temporary spaces in the line, thirty-eight hundredths of an inch short, seven spaces each five-hundredths of an inch in thickness, if inserted, would aggregate thirty-five hundredths and leave the line three-hundredths of an inch too short and seven spaces each six-hundredths of an inch and make the line four-hundredths of an inch too long.; but the proper justification of this line can be accomplished by inserting three six-hundredths-of-an-inch spaces (amounting to eighteen-hundredths) and four five-hundredths-of-an-inch spaces, (amounting to twenty-hundredths,) the aggregate of which is equal to the required thirty-eight hundredths of an inch. It is necessary, therefore, that the space-case be moved after the insertion of the first three spaces to cause the remaining spaces inserted in this line to be of the next size smaller. Mechanism for doing this (called the "fractional-spacing mechanism") will now be described. This mechanism operates during justification of the line as temporary spaces are being replaced by permanent spaces to shift the space-case at the proper time whenever the insertion of the next smaller size of space should begin. This fractional-spacing mechanism is one of the essential features of the present invention, and I will now describe it as it really forms a part of the space-selecting mechanism, though its operation does not begin until after the insertion of the first permanent space by mechanism to be hereinafter described.

As heretofore stated, between the lower edge of the plate $j^{14}$ and the upper edge of the stepped bar $j^{21}$ are a series of plungers K, forming distance-pieces. There are as many sets of these plungers as there are different numbers of spaces in the lines which the machine is adapted to justify—that is, eleven in the present instance. The number of plungers in the different sets varies from two to twelve. These plungers appear best in Figs. 1, 4, 6, 10, and 12 to 17, inclusive. They are contained in a suitable frame $k$, consisting of a pair of side plates $k'$ and $k^2$ and end plates $k^3$ and $k^4$ and partitions $k^5$, dividing the frame into eleven vertical spaces. The plungers in each instance fill the total width of the space and are frictionally held in the frame by suitable means, as the springs $k^7$, bearing against them.

In the sides of the side plates $k'$ and $k^2$ are grooves $k^8$, by which the frame is slidably held to stationary gibs $k^9$, secured to the frame-bracket $A^2$. The side plate $k^2$ of the frame has an extending arm $k^{11}$, which is connected to a block $k^{12}$, Figs. 1, 2, 4, and 8, slidably mounted on a stationary stud $k^{13}$ and having at its lower end a pin $k^{14}$, engaging in the collar $g'$ on the shaft $g$. Thus simultaneously with the placement of the gears G the frame $k$ is given a position corresponding thereto. If the smallest gear G is in engagement with the rack H, as shown in Fig. 4, the rearmost set of plungers K are directly between the plate $j^{14}$ and the bar $j^{21}$. If the second gear engaged the rack H, the second set of plungers would occupy this position, and if the largest gear engaged the rack the foremost set of plungers would be between the plate $j^{14}$ and the bar $j^{21}$.

While the high face of the crown-cam $q^7$ is passing the roller $q^6$, (shortly after the commencement of the rotation of the line-shaft,) and hence while the gears and plungers are standing in their forward position, a platform $k^{21}$, Figs. 1 and 4, directly beneath the plungers is elevated by means of the cam $k^{22}$ engaging and raising the roller $k^{23}$ on a link $k^{24}$, which connects with such platform. Thus upward movement of the platform raises all the plungers into their initial position against the lower face of the bracket $k^{30}$ and the alined wall of the opening in the frame-plate $A^2$, as shown in Figs. 1 and 4. In this position the plungers are held by friction produced by their springs $k^7$, wherefore the plunger-frame may be moved rearward, as stated, to select a set of plungers corresponding to the number of spaces in the line.

The plungers K are peculiarly formed. In each set there are as many plungers as there are spaces in the corresponding line. The lower ends of the plungers in any set are all of equal width, the individual width varying with the number of plungers in the set, and the aggregate width being equal to a step of the bar $j^{21}$, while the upper ends with the exception of the last plunger in each set are all the same width irrespective of their number or set, and the last plunger may be of the same width, but is preferably of a width sufficient to fill up the remaining space in the frame. Thus the set of plungers for the twelve-space line (shown in Fig. 17) consists simply of twelve bars of equal width above and below. In the set of plungers for the two-space line (shown in Fig. 15) the lower ends of the plungers are each one-half of the distance across the frame, while at their upper ends one of the plungers is one-twelfth of the distance and the other plunger is eleven-twelfths. So for the ten-space set (shown in Fig. 16) the lower faces of each of the plungers are one-tenth of the total distance, while the upper faces of nine of the plungers are one-twelfth of the distance, and the last plunger is three-twelfths, though the width of its upper face is theoretically immaterial, wherefore the characteristic of the plungers may be stated to be that on one end of them—in this case the lower end—their individual width is the total width of the set divided by the number of spaces in the corresponding line. The upper ends of all except the last in any set are the total width of the set divided by the greatest number of spaces with which the machine is adapted to operate, and the width of the upper end of the last plunger in any set may be any amount, but is preferably for convenience of construction the difference between the aggregate of all the preceding upper ends and the aggregate width of the lower ends, and, finally, the aggregate width of the lower ends is equal to a step of the bar with which those ends coöperate. This characteristic of the plungers can be stated in formulæ as follows: Let L equal width of lower ends of plungers, U equal width of upper ends of plungers, (except the last one,) U' equal width of upper ends of last plunger, T equal total number of spaces which the machine may insert, N equal number of spaces corresponding to any given set of plungers, J equal length of a step of the bar $j^{21}$, (dependent upon the taper of the wedge and the ratio in gearing from the wedge to the bar.)

Then L equals $\frac{J}{N}$, U equals $\frac{J}{T}$, U' equals $$J-(N-1)U = J-(N-1)\frac{J}{T} = \frac{JT-NJ+J}{T} = \frac{J}{T}(T-N+1.)$$

Now the plungers are allowed vertical movement independent of each other to an amount equal to the rise of a step on the bar $j^{21}$. This movement is provided by gaps $k^{10}$ between the overhanging edges of the plungers, except in the case of the set for the maximum number of spaces, Fig. 17, which have the same size above as below and have no overhanging portions and are independently movable.

Connected with the plate $j^{14}$, Figs. 6 and 10, is a bar $k^{31}$, having on its under side teeth $k^{32}$, (twelve in number,) which may be engaged by a pawl $k^{33}$, operated by a bell-crank lever $k^{34}$, which is connected by a link $k^{35}$ with another bell-crank lever $k^{36}$, which is connected to a link $k^{37}$, yoked around the word-shaft N and operated by a cam $k^{38}$, which engages a roller $k^{39}$ on said link $k^{37}$ and forces it to the right, Fig. 6, once for each space substituted. (This word-shaft N, as hereafter explained, rotates once for each space in the line, causing the substitution of a selected permanent space for the temporary spaces contained in the line.) Such movement of the link $k^{37}$ operates to move the pawl $k^{33}$ to the right, and this pawl rising from beneath the bracket $k^{41}$, by reason of the spring $k^{42}$, engages a tooth $k^{32}$ and moves the bar $k^{31}$ one tooth to the right against the force of the spring $j^{15}$. The friction between the plate $j^{14}$ and the plungers holds the plate in the position it thus assumes. Thus immediately following the insertion of each permanent space into the line the plate $j^{14}$ is moved to the right a distance of one tooth $k^{32}$, and this distance is equal to the width of the upper end of each of the plungers K, except the last plunger, in the different sets. Now in the initial position of the space-case the plate $j^{14}$ is, as shown in Fig. 10, over all of the plungers of that set which is beneath it. As each space is replaced by a permanent space this plate $j^{14}$ is moved to the right, Fig. 10, the distance of the width of top end of one plunger. This movement has no effect on the space-case as long as the plate $j^{14}$ stands on a plunger whose lower end is supported by the bar $j^{21}$; but as soon as the plate $j^{14}$ comes onto a plunger whose lower end is not thus supported—for example, the third plunger shown in Fig. 10—the spring $j^{23}$, Fig. 6, pulling downward through the arm $j^{22}$ on the bar $j^{11}$ will force that bar, the plate $j^{14}$, and the remaining plungers downward until all the remaining plungers engage the next lower step on the bar $j^{21}$. This will bring downward the plate J one step, releasing the block $j'$ and allowing the space-case to shift, under the influence of the spring $j^{8}$, to bring the next smaller size of permanent space into the ejection position. This size of space is therefore inserted for the remainder of the line, as the subsequent movements of the plate $j^{14}$ are idle.

The pin-and-slot connection $j^{29}$ between the arm $j^{22}$ and the arm $j^{4}$ allows independent movement of the arm $j^{22}$ to bring down the plate J, as stated. Subsequently when the space-case during the revolution of the line-shaft D returns to its extreme left this pin and slot, engaging, elevates the plate $j^{14}$ to its uppermost position by means of the arm $j^{22}$ and bar $j^{11}$.

The taper of the measuring-wedge and the ratio of the theoretic gear for a one-space line are such as to cause movement of the stepped bar $j^{21}$ through the length of one step for each one-hundredth of an inch—that is, the unit of difference in size of the spaces—of shortness in the line as measured. The series of permanent spaces are: first size, .03 inch thick; second size, .04 inch thick; third size, .05 inch thick; fourth size, .06 inch thick; fifth size, .07 inch thick; sixth size, .08 inch thick; seventh size, .09 inch thick; eighth size, .10 inch thick; ninth size, .11 inch thick. The temporary space is .03 inch thick. When the second gear is engaged, this movement of the bar $j^{21}$ (by reason of this reduced ratio between the gear $g^{12}$ and the selected driving-gear G) is one-half of the length of a step of the bar for each one-hundredth inch of shortness in the length of the line, and likewise for each succeeding gear the movement of the stepped bar is equal to the length of its step divided by the theoretic number of the gear engaged. In other words, as stated, the portion of a step which is moved for each unit of shortness of the line is the reciprocal of the number of spaces in that line.

Assuming that a line has six spaces in it, the sixth theoretic (fifth actual) gear will therefore be engaged, and for each hundredth of an inch of shortness in the line the stepped bar will be moved one-sixth of the length of a step. Thus if such a line with temporary spaces in place were still twelve-hundredths of an inch short the movement of the measuring-wedge would move the stepped bar twelve-sixths of the length of a step, which would be two complete steps, bringing the set of plungers entirely on the third step, (the zero position of the plungers being directly over the first step adjacent to the corner of the second step,) causing the insertion of spaces of the third size, each five-hundredths of an inch in thickness, which spaces thus aggregate thirty-hundredths of an inch. The temporary spaces withdrawn being of three-hundredths of an inch thickness, aggregate eighteen-hundredths, and thus the line has been expanded by the substitution the difference of twelve-hundredths, which was the measured shortage. Suppose, however, that the line was eight-hundredths of an inch short. This, with six spaces in the line, would cause the bar to be moved eight-sixths of the length of a step, or one and two-sixths steps, thus causing the plungers to descend upon the third step two-sixths of its length from the end adjacent to the second step. The first space inserted, therefore, will be of the third size or five-hundredths of an inch thick. After its insertion the fractional spacing mechanism, as above described, causes the plate $j^{14}$ to move back the thickness of the top of the first plunger. This does not change the elevation of this plate, however, and thus another five-hundredths of an inch space is inserted as the second space in the line. After its insertion the plate $j^{14}$ is again moved the width of a plunger, and thus comes entirely into the four remaining unsupported plungers, whereupon the spring $j^{23}$, Fig. 6, brings down the stepped plate J, the bar $j^{11}$, plate $j^{14}$, and the four remaining plungers the height of one step. This releases the block $j'$ and shifts the space-case to the next smaller size of spaces. The third space will therefore be four-hundredths of an inch thick. After the insertion of this space the plate $j^{14}$ is again retracted the width of one plunger top, as before; but all the remaining plungers are now supported on the second step, so that this retraction is idle. The fourth, the fifth, and the sixth spaces are thus all of the second size, or four-hundredths of an inch thick. The permanent spaces thus inserted are two of five-hundredths of an inch and four of four-hundredths of an inch, and the temporary spaces removed are six of three-hundredths of an inch, causing a net lengthening of the line of $2 \times .05 + 4 \times .04 - 6 \times .03$—that is, $.10 + .16 = .18$, or .08, which was the measured shortage. It will thus appear that not more than two sizes of spaces will ever be inserted in a single line, the aggregate width of the lower ends of any set of plungers never exceeding the length of a step on the bar $j^{21}$. When it happens that the entire set of plungers rest upon a step with the first plunger directly adjacent to the end of the next higher step the spaces inserted in that line will all be of the same size, all the subsequent movement of the plate $j^{14}$ being idle.

*Line-advancing mechanism.*—The line-advancing mechanism acts immediately after the lowering of the measuring-wedge to advance the line in a position where its first temporary space can be replaced by a permanent space. The mechanism thus acts before the fractional spacing mechanism which has been just described.

Slidable on a rail $A^9$, Figs. 5 and 9, parallel with the justifying-channel, is a follower-block B. Leading from the left-hand end, Fig. 1, of this block and descending over a pulley is a cord $b^3$, having attached at its lower end a weight $b^4$, wherefore the block is given tendency to return to its initial position. Depending from the block is an arm $b^5$, extending into the type-channel and engaging a follower $b^{40}$ to shove along the type. A dog $b^6$, pivoted in this block and pressed by a spring $b^7$ against the rail $A^9$, tends to retain the block in whatever position it may be after it has been advanced. For advancing the block I provide a cord $b^8$, which passes rearward and then downward from a pulley and finally around a drum $b^9$, which drum is on a shaft $b^{11}$, pivoted in a suitable floating framework $b^{12}$. On the other end of this shaft is a gear $b^{13}$, adapted to be brought into mesh with a gear $b^{14}$, loosely journaled on the shaft N and constantly rotated.

Following the lowering of the measuring-wedge, a cam projection $b^{16}$ on the hub of one of the cams on the line-shaft D engages a roller on the link $b^{18}$ and forces that link to the left, Fig. 9, thus swinging an arm $b^{19}$, with which the link connects, and withdrawing a lug $b^{20}$ on that arm from a projection on the frame $b^{12}$. The frame thus drops slightly downward under the influence of the spring $b^{21}$ until its projection comes in front of the lug $b^{20}$, whereupon the return of the arm $b^{19}$ under the influence of the spring $b^{22}$ swings the frame $b^{12}$ forward, bringing the gear $b^{13}$ into mesh with the gear $b^{14}$. This rotates the drum $b^9$, drawing down the cord $b^8$ and advancing the block B, and with it the follower $b^{40}$ and line of type Z. As type are advanced they press downward the beveled face of the lever P, Figs. 6, 19, and 20, and this presses downward one end of the spring $p$. The other end of this spring presses upward on a lever P', which has a nose $p'$, which is thus caused to bear against the under side of the advancing line of type. As soon as the first temporary space comes over this nose the latter springs up into the notch of the temporary space, and the succeeding type engages the front face of the nose and shoves the lever P' rearward the slight distance which the slot $p^{10}$ in the lever allows. This stops the advancing line and also swings the lever $p^3$ and initiates the rotation of the word-shaft, which causes the substitution of permanent spaces for the temporary spaces. This will be described hereinafter. When the line is brought to a stop, as described, the continued rotation of the line-advancing shaft $b^{11}$ causes the drum $b^9$ to wind up on the now-locked cord $b^8$, thus raising the floating frame $b^{12}$ until its projection clears the lug $b^{20}$, whereupon this frame is moved backward by the spring $b^{30}$, disengaging the gears $b^{13}$ and $b^{14}$ and stopping the rotation of the drum.

I have now completed the enumeration of the operations initiated by the line-shaft, and they may be summarized as follows: First, the cam $j^7$ shifts the space-case to the extreme left and raises the stepped block J. Second, the crown-cam $g^7$ moves the gears and plungers forward, withdrawing the gears from engagement with the rack H and permitting them to be rotated back to their zero position by the spring $g^{16}$, acting through the shaft $g$. Third, the cam $c^{24}$ moves the space-accounting plate $c^9$ to the right and back, again locating the rack H, and simultaneously the cam $k^{22}$ raises the platform $k^{21}$ beneath the plungers. Fourth, the cam-piece $c^{26}$ on the side of the cam $f^{14}$ releases the space-accounting pawls. Fifth, the crown-cam $g^7$ allows the return of the gears and plungers until they are stopped by a gear engaging the rack. Sixth, the cam $f^{14}$ allows the wedge to rise, rotating the gears and shifting the bar $j^{21}$. Seventh, the cam $j^7$ lowers the stepped block J and primarily locates the space-case. Eighth, the cam $j^{14}$ lowers the wedge to initial position. Ninth, the cam projection $b^{16}$ throws into action the line-advancing mechanism.

*Space-substituting mechanism.*—As stated, the final operation of the line-shaft is to initiate the operations of line-advancing mechanism, which draws the line forward until stopped with its first temporary space over the nose of the trip-lever P', with that lever shoved rearward as far as the short slot $p^{10}$ allows. This slight movement swings the pivoted lever $p^3$, Fig. 6, which bears at its lower end against an arm $p^4$ on a rock-shaft $p^5$, secured to the other end of which is an arm $p^6$, Fig. 9, depending from which is a link $p^7$. This link is suitably guided at its lower end and normally operates to hold in idle position the pawl $p^8$ on a disk $p^9$. The rocking of the lever $p^3$, however, raises the link $p^7$ and releases this pawl, whereupon it springs into engagement with a continuously rotating clutch member $p^{11}$, loose on the word-shaft N. The disk $p^9$ is rigid on the word-shaft, and thus rotation of the latter is initiated. The first movement of the shaft N is to bring a decreasing face of the cam $q$, Figs. 1 and 3, into engagement with the roller $q'$ on the link $q^2$, and this, acting through the arm $q^3$ and rock-shaft $q^4$, allows the ejector-arm $q^5$ to be drawn forward by the spring $q^7$, Fig. 4. The upper end of this ejector-arm is connected by a link $q^8$ with the ejector-bar Q. The space-case I is located directly in front of the ejector-bar, and the latter, being advanced by the spring $q^7$, shoves out of the space-case the lower space from that channel of the space-case which the space-selecting mechanism heretofore described holds in front of the ejector.

The space is ejected into a barrel L, Figs. 5 and 7, which I call the "space-turner" and which carries peripheral teeth meshing with a rack $l$. This rack is connected by a bell-crank $l'$ with a link $l^2$, whose lower end yokes around the shaft N. Just after the space has been injected into the space-turner and while a concentric face of the cam $q$ is rotating past the roller $q'$ a decreased face on a cam $l^3$, acting on a roller $l^4$ of the link $l^2$, allows the spring $l^5$ to swing the bell-crank lever $l'$ to turn the space-turner ninety degrees, thus turning the space from its flat side to a position on edge. This same movement of the rack $l$ releases the arm $l^7$, Figs. 5, 19, 20, whose spring $l^8$ moves it to the left, whereupon it engages an arm $l^9$, carried by the lever P' and having a nose which stands within the notch of the temporary space, and swings this arm to shove forward that portion of the line which is in advance of the temporary space engaged. This opens a gap in the line for the insertion of the permanent space. Thereafter a decreasing face of the cam $q$ allows the spring $q^7$ to move the ejector farther forward, thus causing it to shove the permanent space out of the space-turner into the line-gap, and this permanent space shoves out ahead of it the temporary space, whose bevel $r'$ forces down the nose of the lever $P'$ below the level of the adjacent types, permitting this lever to slip back under the succeeding type. The temporary space is shoved out through the groove $a^9$ to some convenient point. These operations of ejecting permanent spaces, turning it on its axis, forming the gap, and inserting the space have consumed nearly a revolution of the shaft N. As this shaft is approaching its initial position a pin $b^{24}$, projecting from the side of the disk $p^9$, engages a lug $b^{25}$, projecting downward from the link $b^{18}$, and this shoves that link to the left, Fig. 9, again releasing the frame $b^{12}$ and throwing into action the line-advancing mechanism. The drum $b^9$ is thus again rotated until the line is again stopped by the next temporary space engaging the trip-lever $P'$, which initiates another substitution of permanent space for temporary space. This operation of substituting a permanent space for a temporary space and then advancing the line to bring the next temporary space into position automatically continues until all the temporary spaces are replaced by permanent spaces. Then the line-advancing mechanism moves the line to the extreme left, where it may be passed by any suitable mechanism into a galley. (Not shown.) The stoppage of the line in its justified form, as before, causes the drum $b^9$ to wind up on the cord $b^8$, drawing the gear $b^{13}$ out of action. At the same time the dog $b^6$ in the follower B comes into a notch $a^8$ in the rail $A^9$, and thus releases its hold, and the weight $b^4$ returns the block to the initial position, carrying back the follower $b^{40}$, whose bevel allows it to pass under the pawl $b$. It is immediately following the substitution of a permanent space for a temporary one that the cam $k^{38}$ on the shaft N operates the fractional-spacing mechanism, as heretofore explained. The sequence of operations of the word-shaft is thus as follows: First, a permanent space is inserted in the space-turner. Second, the space-turner is rotated and the gap opened in the line. Third, the injection of the space is completed and the ejector returns. Fourth, the space-turner is returned to initial position; fifth, at the same time the fractional-space movement is given to the plate $j^{14}$, and, sixth, the line is advanced until the next temporary space is engaged.

Power is brought to the machine by suitable gears (not shown) which engage and continuously rotate the bevel-gears $d^{10}$ and $n$, loose upon the shafts D and N, respectively, and rigidly connected with the clutch members $d^5$ and $p^{11}$.

I claim—

1. In a justifying mechanism, mechanism for governing the size of permanent spaces to be in the line, which mechanism includes a series of sets of independently-movable members, each set corresponding to a different number of spaces in the line.

2. In a justifying mechanism, the combination of a member placed according to the line shortage and the number of spaces in the line, mechanism for governing the size of permanent space to be placed in the line, a connection between the same and said member which includes a series of sets of plungers, each set corresponding to a different number of spaces in the line, and means for positioning said plungers relative to the stepped member and the connection to the permanent spaces.

3. In a justifying mechanism, the combination of means for placing permanent spaces graded with respect to thickness, and mechanism coöperating with the same which includes a series of sets of independently-movable members each set comprising a number of members equal to the number of spaces in the line which that particular set is adapted to justify.

4. In a justifying mechanism, mechanism for governing the fractional spacing, consisting of a stepped member and a coöperating series of sets of plungers, each set comprising a number of plungers equal to the number of spaces in the line which that particular set is adapted to justify, the faces of the plungers in any set which engage the stepped member being each a fraction of the aggregate width of the complete set equal to the reciprocal of the number of spaces, said plungers having other operative faces which are of the same width irrespective of their set.

5. In a justifying mechanism, the combination of a member placed according to the line shortage and the number of spaces in the line, means for placing permanent spaces graded with respect to thickness, a connection between the same and said member which includes a series of sets of plungers, each set comprising a number of plungers equal to the number of spaces in the line which that particular set is adapted to justify, the faces of the plungers in any set which engage said member being each a fraction of the aggregate width of the complete set equal to the reciprocal of the number of spaces, the plungers being capable of independent movement.

6. In a justifying mechanism, a series of sets of plungers, each set comprising a number of plungers equal to the number of spaces in the line with which that set operates, the plungers in any set having one engageable face of a width equal to the total width of the set divided by the number of spaces for that set, and the plungers having other engageable faces of a width the same irrespective of their set.

7. In a justifying mechanism, the combination, with line-measuring mechanism and space-accounting mechanism, of a stepped member placed according to the two preceding mechanisms, mechanism for placing permanent spaces graded in respect to their thickness, and a connection between the same and said stepped member, said connection including a series of members adapted to engage such steps, said series contacting with said stepped member throughout a space equal to the length of one of its steps.

8. In a justifying mechanism, the combination, with line-measuring mechanism and space-accounting mechanism, of a stepped member placed according to the two preceding mechanisms, means for placing permanent spaces graded in respect to their thickness, and a connection between the same and said stepped member, said connection including a series of plungers adapted to engage the steps of said member, said plungers at the face which engages said steps being of aggregate width equal to the length of a step, and there being independent movement between the plungers.

9. In a justifying mechanism, the combination, with line-measuring mechanism and space-accounting mechanism, of a member placed according to the two preceding mechanisms, means for placing permanent spaces graded in respect to their thickness, a connection between the same and said member, said connection including a series of independently-movable plungers, and means for causing periodic movement between a portion of the connection to the permanent spaces and faces of said plungers.

10. In a justifying mechanism, in combination with line-measuring mechanism and space-accounting mechanism, a member positioned according to the two preceding mechanisms, a series of sets of plungers each set corresponding to a different number of spaces, means for placing permanent spaces, and a connection between the same and said member which connection includes said plungers.

11. In a justifying mechanism, in combination with line-measuring mechanism, space-accounting mechanism, a member positioned according to the two preceding mechanisms, a series of sets of plungers each set corresponding to a different number of spaces, means for placing permanent spaces, and a connection between the same and said member, which connection includes said plungers as distance-pieces between said stepped member and another portion of the connection.

12. In a justifying mechanism the combination of a stepped member having equal steps, and a coöperating series of sets of plungers each set corresponding in number to a definite number of spaces and the aggregate width of the step-engaging faces of the permanent spaces, a connection between the same and said stepped member which connection includes said plungers as distance-pieces between the steps of said stepped member and another portion of the connection, and means for periodically shifting such other portion of the connection to successively free it from plungers.

13. In a justifying mechanism, in combination, a stepped member governed according to the line's variation from required length and the number of spaces, a series of sets of plungers adapted to engage the steps of said stepped member, a connection between said plungers and space-placing means, each set of plungers corresponding to a definite number of spaces for justification, and means for shifting said series of sets of plungers bodily to bring into engaging position with the stepped member the set corresponding to the number of spaces.

14. In a justifying mechanism, in combination, line-measuring mechanism, space-accounting mechanism, a stepped member placed according to the two preceding mechanisms, a movable space-case adapted to contain spaces graded in respect to thickness, a set of plungers adapted to engage the steps of said member, and a connection between said plungers and movable space-case.

15. In a justifying mechanism, in combination, a stepped member, a movable space-case adapted to contain spaces graded in respect to thickness, a set of plungers adapted to engage the steps of said member, and a connection between said plungers and movable space-case, said connection including another stepped member and mechanism between it and the plungers for causing the space-case to change its position during the justification at a time dependent upon the position of the plungers on a step.

16. In a justifying mechanism, in combination, line-measuring mechanism, space-accounting mechanism, a stepped member placed according to the two preceding mechanisms, a series of sets of plungers adapted to engage the steps of said member, a movable space-case, a connection between same and said plungers, means for moving the plungers to bring the set corresponding to the number of spaces into engaging position, and means for moving the connection between the plungers and the space-case.

17. In a justifying mechanism, in combination, line-measuring mechanism, space-accounting mechanism, a stepped member placed according to the two preceding mechanisms, a series of sets of plungers adapted to engage the steps of said member, a movable space-case, a connection between same and said plungers, means for moving the plungers to bring the set corresponding to the number of spaces into engaging position, and means operated during justification of the line for alternately ejecting permanent spaces from the space-case and moving the connection between the space-case and the selected set of plungers.

18. In a justifying mechanism, the combination of a stepped member governed according to the line shortage and the number of spaces in the line, means for placing permanent spaces graded with respect to thickness, and a connection between the same and said member which includes a series of sets of plungers, each set comprising a number of plungers equal to the number of spaces in the line which that particular set is adapted to justify, the faces of the plungers in any set which engage the stepped member being each a fraction of the aggregate faces of all the plungers (except the last ones) which are engaged by the connection to the permanent spaces equal to the reciprocal of the number of spaces with which that set operates and the other face of all the plungers in every set being of the same width irrespective of their set, the last plunger in each set having that face which is engaged by the connection to the permanent spaces of a width sufficient to make all the plungers the same aggregate width on this face irrespective of the set.

19. In a justifying mechanism, for use in fractional spacing, a series of sets of plungers contained in a movable frame, each set corresponding to a definite number of spaces, means for moving said frame to bring into engaging position a set corresponding to the number of spaces in the line for justification, said plungers consisting of independently-movable bars adapted to act as distance-pieces between said stepped member and the connection to the permanent spaces, the aggregate width of said bars at either end being the same in all the sets, the individual width at one end being a fraction of that end's aggregate equal to the reciprocal of the number of spaces with which that set operates and the other end of all of the plungers in every set being the same definite amount irrespective of the set with the exception of the last plunger which is wide enough on this end to fill out an equal aggregate width of all the sets.

20. In a justifying mechanism, in combination, a stepped member placed according to the line shortage and the number of spaces, a case for permanent spaces graded in respect to thickness, a series of sets of plungers contained in a movable frame, each set corresponding to a definite number of spaces for justification in the line, means for moving said frame to bring into engaging position a set corresponding to the number of spaces in the line, said plungers consisting of independently-movable bars adapted to act as distance-pieces between the stepped member and the space-placing means, the aggregate width of said bars in each set at one end being equal to the length of a step in said stepped member and the individual width at this end being a fraction of the aggregate equal to the reciprocal of the number of spaces with which that set operates and width at the other end of all of the plungers in every set being the same definite amount irrespective of the set, with the exception of the last plunger which is wide enough on this end to fill out an equal aggregate width of all the sets, the plungers thus internally overhanging each other, and there being space where they thus overhang to allow independent movement of them.

21. In a justifying mechanism, the combination of a stepped member placed according to the line shortage and the number of spaces, means for placing permanent spaces, a series of sets of plungers adapted to engage the steps of said member, each set corresponding to a different number of spaces, a movable member engaging said plungers, a connection between said movable member and the permanent spaces, and means operated during the justification of the line for periodically shifting said movable member a definite amount irrespective of the number of spaces.

22. In a justifying mechanism, the combination of a stepped member, a space-case, a series of sets of plungers adapted to engage the steps of said member, a movable member adapted to engage said plungers, a connection between said movable member and said space-case, a shaft rotated for each space to be justified, and operating mechanism including a toothed rack and pawl connecting said movable member with said shaft.

23. In a justifying mechanism, the combination of a stepped member, a space-case, a series of sets of plungers adapted to engage the steps of said member, a movable member engaging said plungers, a connection between said movable member and the space-case, means operated during the justification of the line for periodically shifting said movable member a definite amount irrespective of the number of spaces, a second stepped member in the connection between said movable member to change its position when the movable member passes off of those plungers which have been unsupported by the step of the first stepped member.

24. In a justifying mechanism, in combination, a stepped member, a series of sets of plungers, each set corresponding to a definite number of spaces in the line to be justified, means for bringing into coöperation with a step of said member a set of said plungers which correspond to the particular line being justified to select one size of permanent spaces, said plungers overhanging such step if the line will not exactly justify with one size of space, means for placing a series of permanent spaces graded in respect to thickness, a connection between such placing means and such selected set of plungers, and means for periodically changing the relation of said connection and the set of plungers to cause the connection to eventually come onto the overhanging plungers only, and means for thereupon moving said plungers and connection to select the next size of permanent space.

25. In a justifying mechanism, in combination, a stepped member, a series of sets of plungers, each set corresponding to a definite number of spaces in the line to be justified, means for bringing into coöperation with a step of said member a set of said plungers which correspond to the particular line being justified, said plungers overhanging such step if the line will not exactly justify with one size of space, a space-case for permanent spaces, a connection between the same and such selected set of plungers, a second stepped member included in such connection, means for periodically changing the relation of said connection and the set of plungers to cause the connection to eventually come onto the overhanging plungers only, and means for thereupon moving said plungers and connection to move said second stepped member to cause the space-case to shift to bring into action a different size of permanent spaces.

26. In a justifying mechanism, in combination, a series of gears of different radii selected according to the number of spaces and moved according to the line shortage, a stepped member moved by said gears, a series of sets of plungers placed with relation to said member according to the number of spaces, means for placing permanent spaces, connection between the same and said stepped member, said connection including a movable member which engages the selected set of plungers and moves so as to be consecutively released therefrom.

27. In a justifying mechanism, in combination, a series of gears of different radii corresponding to the number of spaces, a stepped member adapted to be moved by said gears, a series of sets of plungers each set corresponding to a different number of spaces, mechanism for moving said gears and said plungers to select a gear and a set of plungers according to the number of spaces in the line, mechanism for rotating such selected gear according to the line's variation from required length, and fractional spacing mechanism governed by such selected set of plungers.

28. In a justifying mechanism, the combination of a stepped member placed according to the line shortage and the number of spaces in the line, means for placing a series of permanent spaces graded in respect to thickness, a connection between such placing means and the steps of said member, said connection including a series of sets of plungers, the set being selected according to the number of spaces, and including also a movable member engaging said plungers, means for giving said movable member periodically during justification definite movements whose amount is independent of the number of spaces, the faces of the plungers which said member engaged being all, except the last plungers, of the same width irrespective of the set, said plungers having other faces engaging the steps of said stepped member, which latter faces vary in width in the different sets being each of an individual width equal to the length of a step divided by the number of spaces with which that set is adapted to operate.

29. In a justifying mechanism, the combination of a stepped member having steps of equal length, means for placing permanent spaces, a connection between the same and the steps of said member, said connection including a series of sets of plungers, the set being selected according to the number of spaces, and including also a movable member engaging said plungers, means for giving said movable member periodically during justification definite movements whose amount is independent of the number of spaces, the faces of the plungers which said member engages being all, except the last plungers, of the same width irrespective of the set, said plungers having other faces engaging the steps of said stepped member, which latter faces vary in width in the different sets being each of an individual width equal to the length of a step divided by the number of spaces with which that set is adapted to operate, said plungers thus overhanging intermediately and having spaces between them where they overhang to allow independent movement of them.

30. In a justifying mechanism, the combination of a stepped member having equal steps and placed according to the line shortage and the number of spaces in the line, means for placing permanent spaces, a series of sets of independently-movable plungers, the sets differing in the number of their plungers according to the number of spaces, a movable member engaging said plungers, means for giving said member periodically during justification definite movement whose amount is independent of the number of spaces, the faces of the plungers which said member engages being all, except the last plunger, of the same width irrespective of the set, said plungers having other faces engaging the steps of said stepped member, which latter faces vary in width in the different sets being each of an individual width equal to the length of a step divided by the number of spaces with which that set is adapted to operate, the last plunger in each set having that face which is engaged by the movable member of a width sufficient to make all the sets so engaged of the same aggregate width, a shiftable frame carrying the plungers, and a connection between said movable member and the means for placing permanent spaces.

31. In a justifying mechanism, in combination, a stepped member, a series of sets of plungers contained in a shiftable frame, a movable space-case, connection between the same and said plungers, means for shifting the frame crosswise of said stepped member and said connection to bring between them as distance-pieces that set of plungers corresponding to the number of spaces in the line, and means for periodically moving the connection between the plungers and the space-case to cause it to pass from those plungers which engage a step of said stepped member onto those which overhang such step and thus stand in position to be moved to engage the next step.

32. In a justifying mechanism, in combination, a stepped member, a series of sets of plungers adapted to engage the same, whereby some of the plungers may be caused to rest on one step and others on another, and a movable platform adapted once for each line to engage said plungers and return them to initial position.

33. In a justifying mechanism, the combination of a stepped member, a frame containing a series of sets of plungers, each set corresponding to a definite number of spaces for justification, means for moving said frame transversely of the stepped member, a connection between the set of plungers thus selected and means for placing permanent spaces, a movable platform adapted to replace plungers which have been moved from zero position and a flat surface against which the plungers are forced in such replacement.

34. In a justifying mechanism, in combination, a step-bar shiftable longitudinally according to the number of spaces and the line shortage, a movable space-case, a movable plate connected with said space-case, a frame intermediate of said plate and bar and carrying a series of sets of plungers, means for moving said frame according to the number of spaces to bring a selected set of plungers between the bar and plate, the lower ends of the plungers being of an aggregate width just equal to the length of a step on said bar and of an individual width which is said length divided by the number of plungers in that set, and the upper ends of said plungers which are engaged by said plate being, with the exception of the last plunger, of the same width irrespective of the set, and means for giving said plate a movement equal to the upper end of a plunger for each space inserted.

35. In a justifying mechanism, in combination, a stepped bar shifting longitudinally according to the number of spaces and the line shortage, a movable space-case, a movable plate connected with said space-case, a frame intermediate of said plate and bar carrying a series of sets of plungers, means for moving said frame according to the number of spaces to bring a selected set of plungers between the bar and plate, the ends of the plungers coöperating with the bar being of an aggregate width just equal to the length of a step on said bar and of an individual width which is said length divided by the number of spaces in the line corresponding to that set, and the ends of said plungers which are engaged by said plate being, with the exception of the last plungers, of the same width irrespective of the set, a toothed rack for operating said plate a pawl for operating said rack, and means for moving said pawl for each space inserted.

36. In a justifying mechanism, in combination, a stepped bar shifting longitudinally according to the number of spaces and the line shortage, means for placing permanent spaces, a movable plate connected with said means, a frame intermediate of said plate and bar carrying a series of sets of plungers, means for moving said frame according to the number of spaces to bring a selected set of plungers between the bar and plate, the ends of the plungers coöperating with the bar being of an aggregate width just equal to the length of a step on said bar and of an individual width which is said length divided by the number of spaces in the corresponding line, and the ends of said plungers which are engaged by said plate being, with the exception of the last plunger, of the same width irrespective of the set, means for giving said plate a movement equal to the individual width of the last-mentioned ends of a plunger for each space inserted, a series of gears of radii varying according to the number of spaces mounted on a common shaft, means for selecting for action one of said gears according to the number of spaces and moving it according to the line shortage, and gearing connecting said series of gears and said stepped member.

37. In a justifying mechanism, in combination, a stepped bar shiftable longitudinally according to the number of spaces and the line shortage, a movable space-case, a movable plate connected with said space-case, a series of sets of plungers intermediate of said plate and bar, means for moving said plungers according to the number of spaces to bring a selected set between the bar and plate, the lower ends of the plungers being of an aggregate width just equal to the length of a step on said bar and of an individual width which is said length divided by the and the upper ends of said plungers which are engaged by said plate being, with the exception of the last plunger, of the same width irrespective of the set, means for giving said plate a movement equal to the upper end of a plunger for each space inserted, a series of gears of radii varying according to the number of spaces, said plungers being all associated in a frame slidable in the machine crosswise of said stepped bar, mechanism for shifting said series of gears and said frame into corresponding operative position to the number of spaces, gearing connecting said series of gears and said movable member, and means for moving the selected gear according to the line shortage.

38. In a justifying mechanism, in combination, a member having a rigid series of steps, a coöperating series of plungers, and a movable space-case regulated thereby.

39. In a justifying mechanism, in combination, a stepped member, a coöperating series of sets of members and means controlled thereby for selecting permanent spaces.

40. In a justifying mechanism, a series of sets of plungers having two operative faces, one face being dimensioned proportionately to the reciprocal of the number of the spaces in the line with which the set is to be used, and the other face being dimensioned uniformly in all the sets.

41. In a justifying mechanism, plungers having two operative faces, one face being dimensioned proportionally to the reciprocal of the number of spaces in the line with which it is to be used, and a stepped member coöperating with said face.

42. In a justifying mechanism, a series of sets of plungers, each set having a number of plungers equal to the number of spaces in lines of type, at least all of the plungers but one being of equal width at one end, the other ends in each set being equal but differing in the different sets.

43. In a justifying mechanism, a series of sets of plungers having two operative faces, one face of the plungers having a dimension which in the successive sets forms as harmonic series, the corresponding dimension of the other faces being uniform in the different sets.

44. In a justifying mechanism, a series of sets of plungers having one operative face whose aggregate width is an increasing amount with the increase of the number of spaces and having other operative faces which individually decrease in width reciprocally with the increase of the number of spaces.

45. In a justifying mechanism, the combination of mechanism operated in accordance with the number of spaces in a line and the line shortage, mechanism coöperating therewith for governing the selection of spaces to be placed in the line, said mechanism including a series of sets of members which have an operating-face which decreases in a harmonic ratio for the successive sets.

46. In a justifying mechanism, the combination of mechanism operated in accordance with the number of spaces in a line and the line shortage, mechanism coöperating therewith for governing the selection of spaces to be placed in the line, said mechanism including a series of sets of members which have each one operating-face alike irrespective of the set and another operating-face which decreases in a harmonic ratio for the successive sets.

47. In a justifying mechanism, plungers uniformly dimensioned at one end and at the other end dimensioned proportionally to the reciprocal of the number of spaces in the line with which they are to be used.

48. In a justifying mechanism, plungers uniformly dimensioned on one face and having another face dimensioned proportionally to the reciprocal of the number of spaces in the line with which they are to be used, combined with a space-determining mechanism variable according to the line shortage and the number of spaces to be justified.

In testimony whereof I hereunto affix my signature in the presence of two witnesses.

FRANCIS B. CONVERSE, JR.

Witnesses:
ALBERT H. BATES,
J. B. HULL.